United States Patent
Speckbacher et al.

(10) Patent No.: US 8,650,769 B2
(45) Date of Patent: Feb. 18, 2014

(54) ASSEMBLY COMPRISING A MEASURING SCALE ATTACHED TO A SUBSTRATE AND METHOD FOR HOLDING A MEASURING SCALE AGAINST A SUBSTRATE

(75) Inventors: Peter Speckbacher, Kirchweidach (DE); Josef Weidmann, Altenmarkt (DE); Wolfgang Holzapfel, Obing (DE)

(73) Assignee: Johannes Heidenhain GmbH, Traunreut (DE)

( * ) Notice: Subject to any disclaimer, the term of this patent is extended or adjusted under 35 U.S.C. 154(b) by 317 days.

(21) Appl. No.: 13/260,891

(22) PCT Filed: Feb. 23, 2010

(86) PCT No.: PCT/EP2010/052239
§ 371 (c)(1), (2), (4) Date: Sep. 28, 2011

(87) PCT Pub. No.: WO2010/112269
PCT Pub. Date: Oct. 7, 2010

(65) Prior Publication Data
US 2012/0023769 A1    Feb. 2, 2012

(30) Foreign Application Priority Data
Apr. 2, 2009  (DE) .......................... 10 2009 002 142

(51) Int. Cl.
G01D 5/347   (2006.01)
G01D 5/26    (2006.01)
G01B 11/02   (2006.01)

(52) U.S. Cl.
USPC .............................................. 33/707; 33/706

(58) Field of Classification Search
USPC ............................................ 33/706, 707, 708
See application file for complete search history.

(56) References Cited

U.S. PATENT DOCUMENTS

| 5,065,525 | A | 11/1991 | Szenger |
| 7,707,739 | B2 | 5/2010 | Holzapfel et al. |
| 8,234,793 | B2 * | 8/2012 | Weidmann et al. ............. 33/707 |
| 2007/0137059 | A1 | 6/2007 | Holzapfel et al. |

FOREIGN PATENT DOCUMENTS

| DE | 229 334 A1 | 11/1985 | |
| EP | 0 416 391 A2 | 3/1991 | |
| EP | 1 783 463 A1 | 5/2007 | |
| JP | 01189509 A * | 7/1989 | ............. G01B 21/02 |

* cited by examiner

Primary Examiner — R. A. Smith
(74) Attorney, Agent, or Firm — Brinks Gilson & Lione

(57) ABSTRACT

An assembly including a substrate and a scale held on the substrate, wherein the scale has a measuring graduation, and the scale is held on the substrate by pneumatic suction. The scale is braced on the substrate via two-dimensionally distributed, spaced-apart supports, which are disposed facing a measurement area defined by the measuring graduation and wherein adjacent ones of the supports are spaced apart from one another at a mutual period that is less than a thickness of the scale. In addition, the supports have a structure such that a connection by optical contact bonding between the supports and the scale and/or between the supports and the substrate is prevented at least in the measurement area. A space between the scale and the substrate is sealed off from surroundings by a sealing structure.

14 Claims, 4 Drawing Sheets

ASSEMBLY COMPRISING A MEASURING SCALE ATTACHED TO A SUBSTRATE AND METHOD FOR HOLDING A MEASURING SCALE AGAINST A SUBSTRATE

Applicants claim, under 35 U.S.C. §§120 and 365, the benefit of priority of the filing date of Feb. 23, 2010 of a Patent Cooperation Treaty patent application, copy attached, Serial Number PCT/EP2010/052239, filed on the aforementioned date, the entire contents of which are incorporated herein by reference, wherein Patent Cooperation Treaty patent application Serial Number PCT/EP2010/052239 was not published under PCT Article 21(2) in English.

Applicants claim, under 35 U.S.C. §119, the benefit of priority of the filing date of Apr. 2, 2009 of a German patent application, copy attached, Serial Number 10 2009 002 142.6, filed on the aforementioned date, the entire contents of which is incorporated herein by reference.

BACKGROUND OF THE INVENTION

1. Field of the Invention

For measuring the relative position of two machine parts, a scale has to be secured to one of the machine parts, and a scanning unit has to be secured to the other of the machine parts movable relative to one another. During the position measurement, a measuring graduation of the scale is scanned by the scanning unit, and position-dependent scanning signals are generated.

2. Description of the Related Art

One possible way of securing a scale on a substrate is described in East German Patent Disclosure DD 229 334 A1. In it, the scale is forced against the substrate by way of pneumatic suction. For the suction, a suction conduit is provided outside the measuring graduation and is intended to force the scale, over its entire length, against the substrate with a constant contact pressure.

The problem here is that when the scale rests on the substrate, the connection can easily be interfered with by contaminants or the development of air bubbles in the space between the scale and the substrate. These problems lead to changes in length over time and location of the measuring graduation of the scale, which in turn cause errors in the position measurement. This problem occurs to an increased degree in relatively large-area scales.

In European Patent Disclosure EP 1 783 463 A1, a scale fastening by optical contact bonding elements is explained. In large-area optical contact bonding elements, the problem is that a disturbance in the contact face can detach the entire optical contact bonding element, because the detachment spreads. To prevent this large-area detachment of the optical contact bonding connection, the contact face of EP 1 783 463 A1 is subdivided into many small contact faces spaced apart from one another. Although this embodiment does ensure a secure fastening of the scale to a substrate, nevertheless a stress-free contact pressure that is homogeneous over the entire measuring graduation plane is only poorly attained in this way.

In EP 1 783 463 A1, it is pointed out that the optical contact bonding element can be initiated by pneumatic suction of the scale against the substrate. Holding the scale on the substrate by pneumatic suction in the measurement mode of the position measuring instrument is not mentioned. Nor are any structural provisions for the pneumatic suction mentioned.

It is an object of the present invention to disclose an assembly with a scale secured to a substrate, in which the scale is held on the substrate stably in terms of changes in length. Moreover, the scale should be held on the substrate at every point with the most constant possible contact pressure and in a manner free of drifting.

SUMMARY AND OBJECTS OF THE INVENTION

This object is attained by an assembly that includes a substrate and a scale held on the substrate, wherein the scale has a measuring graduation, and the scale is held on the substrate by pneumatic suction. The scale is braced on the substrate via two-dimensionally distributed, spaced-apart supports, which are disposed facing a measurement area defined by the measuring graduation and wherein adjacent ones of the supports are spaced apart from one another at a mutual period that is less than a thickness of the scale. In addition, the supports have a structure such that a connection by optical contact bonding between the supports and the scale and/or between the supports and the substrate is prevented at least in the measurement area. A space between the scale and the substrate is sealed off from surroundings by a sealing structure.

The scale is braced on the substrate via two-dimensionally distributed supports that are spaced apart from one another. The supports are located directly opposite the measuring graduation that defines a measurement area, and they are disposed at a mutual distance that is less than the thickness of the scale. The supports are also embodied such that a connection by optical contact bonding between the supports and the scale and/or between the supports and the substrate is prevented at least in the measurement area of the scale. For creating a homogeneous underpressure in the space between the scale and the substrate, this scale is sealed off hermetically from the surroundings by a sealing structure.

The connection by optical contact bonding elements can be prevented by various provisions.

One of these provisions is that the surface regions contacting one another between the supports and the scale and/or between the supports and the substrate have such great roughness that the roughness prevents a connection by optical contact bonding between the surface regions. These surface regions can also have coatings that prevent optical contact bonding, in particular metal coatings or coatings that act hydrophobically.

A further provision for preventing optical contact bonding is the embodiment of the supports of the scales such that they contact the counterpart face only in point-like fashion.

A further object of the present invention is to disclose a method for holding a scale on a substrate, by which method the scale is held stably on the substrate with respect to changes in length, with the most constant possible contact pressure at every point and without drifting.

This object is attained by a method for holding a scale on a substrate during the scanning of a measuring graduation of the scale for position measurement, wherein the holding during the position measurement is effected by pneumatic suction of the scale against the substrate. The method includes supporting a scale on a substrate by disposing two-dimensionally distributed supports on the scale or the substrate, wherein the supports are disposed facing a measuring graduation of the scale and the supports have a mutual period that is less than a thickness of the scale. The method includes forming a connection by optical contact bonding between the supports and the scale and/or between the supports and the substrate is prevented at least in a measurement area of the scale. The method includes generating a holding force, via pneumatic suction, that acts in a space between the scale and the substrate and sealing off the space from surroundings by a sealing structure.

With the present invention, the attainable advantages of pneumatic suction are exploited in that the most homogeneous possible surface forces are exerted as holding forces, yet at the same time the disadvantages of large-area contact are avoided because many supports separate from one another are provided.

The surface smoothness—even of a large-area scale—is preserved or is not interfered with, since interfering media can be deposited in the spaces formed by the spaced-apart supports. By the provision according to the present invention, short-period errors in length in the plane of the measuring graduation are avoided, and high measurement accuracy is ensured.

In the measurement mode, the scale is secured stably on the substrate, which means great rigidity in the measurement direction and also perpendicular to the plane of the measuring graduation.

With the present invention, in contrast to optical contact bonding, it is ensured that the holding forces generated by the pneumatic suction develop uniformly over the entire surface of the scale. This is achieved by providing that an optical contact bonding element at the contact faces between the scale and the substrate is avoided. Thus there is also the advantage that the contact faces do not have to be machined with high precision; polished surfaces are sufficient.

Exemplary embodiments of the present invention will be described in further detail in conjunction with the drawings.

In the drawings:

DESCRIPTION OF THE PREFERRED EMBODIMENT(S) OF THE INVENTION

Figure 1:
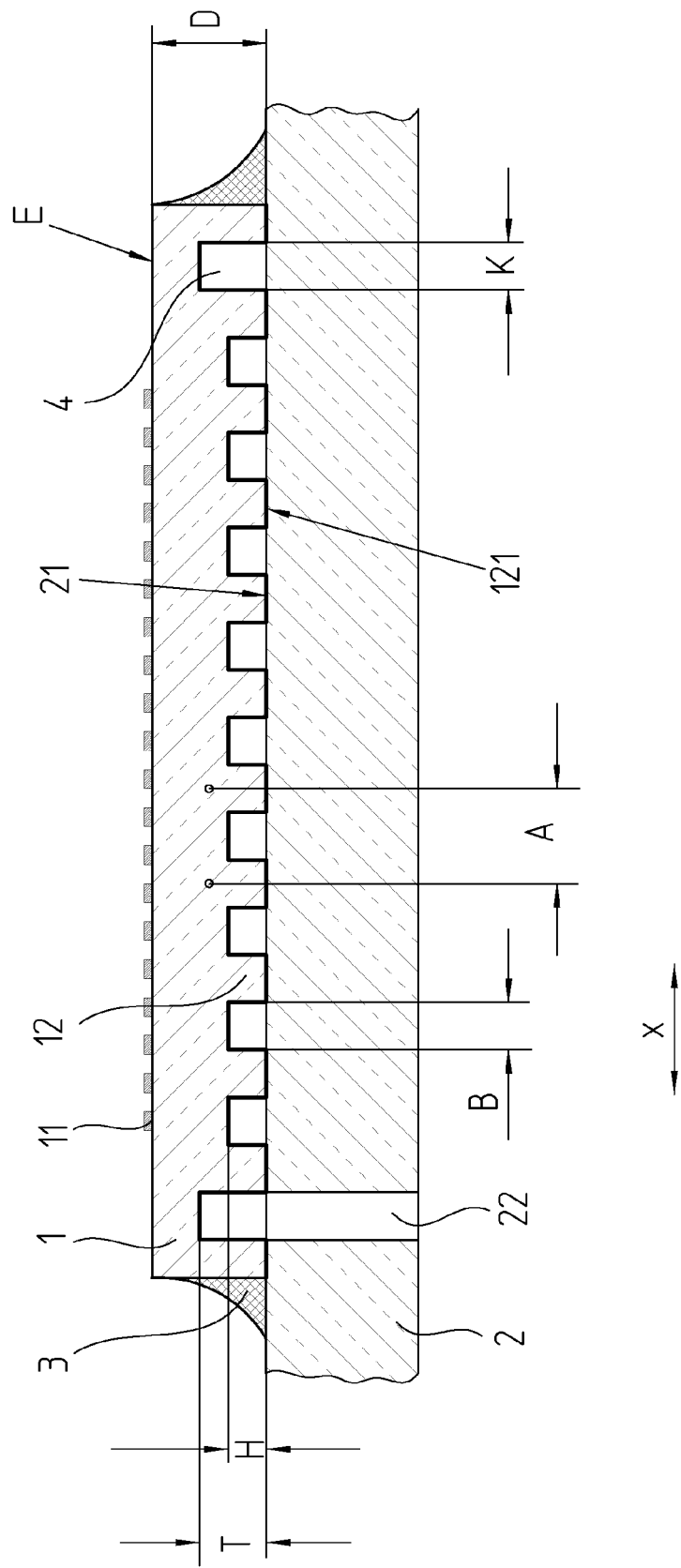
FIG. 1 shows a cross-sectional view of an assembly of a scale held on a substrate in accordance with a first exemplary embodiment of the present invention.
Figure 2:
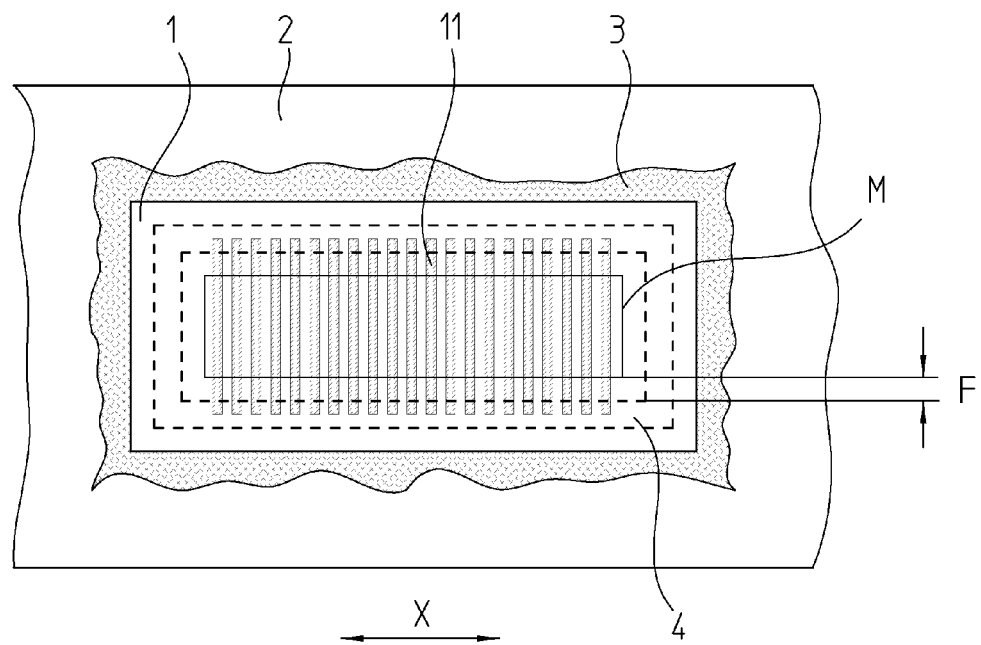
FIG. 2 is a plan view of the assembly of FIG. 1.

A first exemplary embodiment of the present invention will be explained in conjunction with FIGS. 1 through 3. In it, a scale 1 of glass or glass ceramic (such as the glass material sold under the trademark ZERODUR) with a measuring graduation 11 is shown. The measuring graduation 11 is an incremental graduation, which is scanned in the measurement direction X by a scanning unit, not shown, for generating position-dependent scanning signals during a position measuring process. The measuring graduation 11 can be a reflective amplitude grating or a phase grating, wherein in a known manner measuring graduation 11 provides high-precision interferential position measurement. During such position measurement, the scale 1 is held on a substrate 2 by pneumatic suction. Pneumatic suction is defined to be clamping by a vacuum, also known as vacuum clamping. This substrate 2 preferably includes a material which has the same thermal expansion as the scale 1. The mean coefficient of thermal expansion α in the temperature range from 0° C. to 50° C. of the scale 1 and substrate 2 is preferably less than $0.1 \times 10^{-6} K^{-1}$ when glasses with so-called zero expansion are used, such as glasses sold under the trademarks ZERODUR, SITAL and ULE, and less than $1.5 \times 10^{-6} K^{-1}$ when metals are used, such as metals sold under the trademark of INVAR.

Raised areas 12 are embodied on the surface of the scale 1 toward the substrate 2. These raised areas 12 are spatially distributed two-dimensionally, either distributed geometrically uniformly in a regular grid or distributed statistically. The raised areas 12 are disposed with a mutual period A of less than the thickness D of the scale 1. In particular, the raised areas 12 are disposed at a mutual period A of less than 1/10 the thickness D of the scale 1. These conditions are preferably met at every point of the two-dimensional distribution of the raised areas 12, but at least inside the measurement area M. As shown in FIG. 2, the measurement area M is defined by the area of the measuring graduation 11 that is used for the high-precision position measurement. As shown in FIG. 2, the thickness D of the scale 1 is the spacing between the measuring graduation plane E, in which the measuring graduation 11 is located, and the contact face 21 of the substrate 2.

By this provision, it is ensured that all the tensile and compressive stresses that are introduced by the fastening have a spatially (expanded) high-frequency component so that they degrade over the thickness D of the scale 1 and do not act as length errors in the measuring graduation plane E. Because the support directly faces the measuring graduation 11, in the measurement mode the scale 1 is secured stably on the substrate 2, which means high rigidity in the measurement direction X as well as perpendicular to the measuring graduation plane E.

The height H of the raised areas 12 is advantageously greater than 20 μm; favorable values are in particular 50 μm to 200 μm. Typical values for the thickness D of the scale 1 are in the range from 1 to 15 mm. The raised areas 12 form two-dimensionally distributed, spaced-apart supports for the scale 1.

The surfaces 121, contacting the substrate 2, of the raised areas 12 of the scale 1 and/or the contact face 21 of the substrate 2 that contacts the raised areas 12 have such great roughness that the roughness prevents a connection by optical contact bonding between these surfaces 121, 21. In particular, the roughness of at least one of these surfaces 121, 21 contacting one another is greater than 1 nm.

The two-dimensional spatial distribution of the raised areas 12 shown in FIG. 3 as viewed on the scale from below is effected in such a way that between the raised areas 12, opening conduits are created that extend as far as a suction conduit 4. By this provision, the air can be homogenously aspirated by suction over the entire surface area of the scale 1 via the opening conduits, which ensures good smoothness of the scale 1. In addition, the holding force generated by the pneumatic suction can act uniformly over the entire surface area so that the scale 1 is forced at every point against the contact face 21 of the substrate 2 with at least an approximately equal force. The raised areas 12 can have a square shape, as shown schematically in FIG. 3, but they can also have other shapes, such as a cylindrical shape.

A majority of the particles located in the space between the scale 1 and the substrate 2 and which would interfere with the smoothness of the scale 1 have a size up to 20 μm. For this reason, it is advantageous if the opening conduits have a width B of at least 20 μm; that is, the mutual peripheral spacing of the contact faces 121 of the raised areas 12 amounts to at least 20 μm. To generate sufficient holding forces, the linear extent of the contact faces 121 of the raised areas 12 should be markedly less than the period A.

The space between the scale 1 and the substrate 2 is sealed off from the surroundings by sealing structure 3. The sealing structure 3 is designed and disposed in such a way that no unstable interfering forces are exerted by them, and in particular, shear forces should be avoided.

In the first example shown, the sealing structure 3 is a sealing composition. High-viscosity liquids, silicones, kneading compositions, epoxy resins, adhesives, or adhesive strips can be used as the sealing composition. If liquids are used as the sealing structure, they should have a viscosity higher than 100 Ns/m².

Instead of the sealing composition, a sealing lip, for instance of a plastic such as those sold under the trademarks Teflon or Perburan, can be used.

The sealing structure can also be a solid rib extending all the way around, embodied or mounted on the scale 1 and/or on the substrate 2, or mounted as a separate part in the form of an intermediate element. If the sealing structure is embodied on the substrate 2 and/or on the scale 1, then it is advantageously made by the same production process as the raised areas 12. The sealing structure 3 can also engage a groove in the scale 1 and/or the substrate 2.

The pneumatic suction is effected via an opening 22, which leads to the suction conduit 4. As shown in FIG. 2, the suction conduit 4 is disposed outside the measuring graduation 11, surrounding the measurement area M, and in particular extending all the way around. "Outside the measurement area M" is defined to be outside the region of the measuring graduation 1 used for the high-precision position measurement. The suction conduit 4 is furthermore disposed inside the space, sealed off by the sealing structure 3, in the scale 1 and/or in the substrate 2. If there is adequate sealing off of the space between the scale 1 and the substrate 2 and a sufficiently large cross section of the suction conduit 4, no interfering pressure drop occurs in the suction conduit 4 even if there are small leaks in the sealing structure 3. It is thereby ensured that even in the space between the scale 1 and the substrate 2, a homogeneous underpressure develops. It is therefore advantageous that the cross section of the suction conduit 4 is considerably greater than the areas of leak that occurs during operation. As a result, a pressure drop in the space between the scale 1 and the substrate 2 is avoided. It is also advantageous that the suction conduit 4 is spaced apart from the measurement area M by a lateral spacing F, wherein, spacing F should be greater than the thickness D of the scale 1. As a result, problems that are nevertheless introduced through the suction conduit 4 are degraded across the lateral spacing F and do not reach the measuring graduation plane E. Preferably the width K of the suction conduit 4 is narrow compared to the thickness D of the scale 1, so that at most, stresses with only spatially high-frequency components are created, which in turn are well-suppressed across the thickness D of the scale 1 toward the measuring graduation plane E. To achieve the requisite large cross-section of the suction conduit 4, this conduit should be embodied with a suitable depth T.

Figure 3:
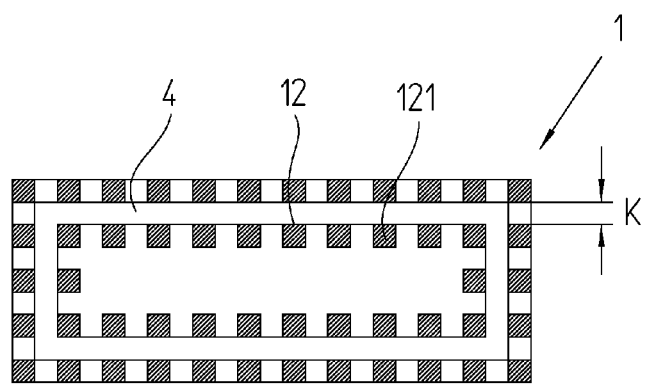
FIG. 3 is a view of the scale of FIG. 1 as viewed from below the assembly of FIG. 1.

It is advantageous if supports, for instance in the form of the raised areas 12, are also disposed outside the suction conduit 4, as schematically shown in FIG. 3. As a result, bending stresses at the edges of the scale 1 are avoided.

The final pressure thus generated in the sealed-off space is typically in the range from 100 to 800 mbar, and the change in the pressure over time, such as a few seconds, is less than 2 mbar.

In the example described above, the spaced-apart raised areas 12 are embodied in the form of bumps that are integral with the scale 1. They are preferably made by known structuring methods, by covering the regions with the raised areas 12 and etching away the material around the raised areas 12.

Raised areas can alternatively or in addition be embodied on the substrate 2 as well.

The raised areas 12, embodied on the scale 1 or on the substrate 2, can also be created by other erosive methods, such as sawing, milling, jet machining or laser machining.

The supports can also be embodied by independent stable spacer elements which are placed between the scale and the substrate. The spacer elements can include structured layer applied to the scale or to the substrate. They can also be embodied as an independently manipulatable part, especially in the form of a structured intermediate layer or intermediate plate, which can be a perforated metal foil.

It is especially advantageous to use supports that contact the scale in point-like fashion, in order thereby to securely avoid a partial optical contact bonding.

Figure 4:
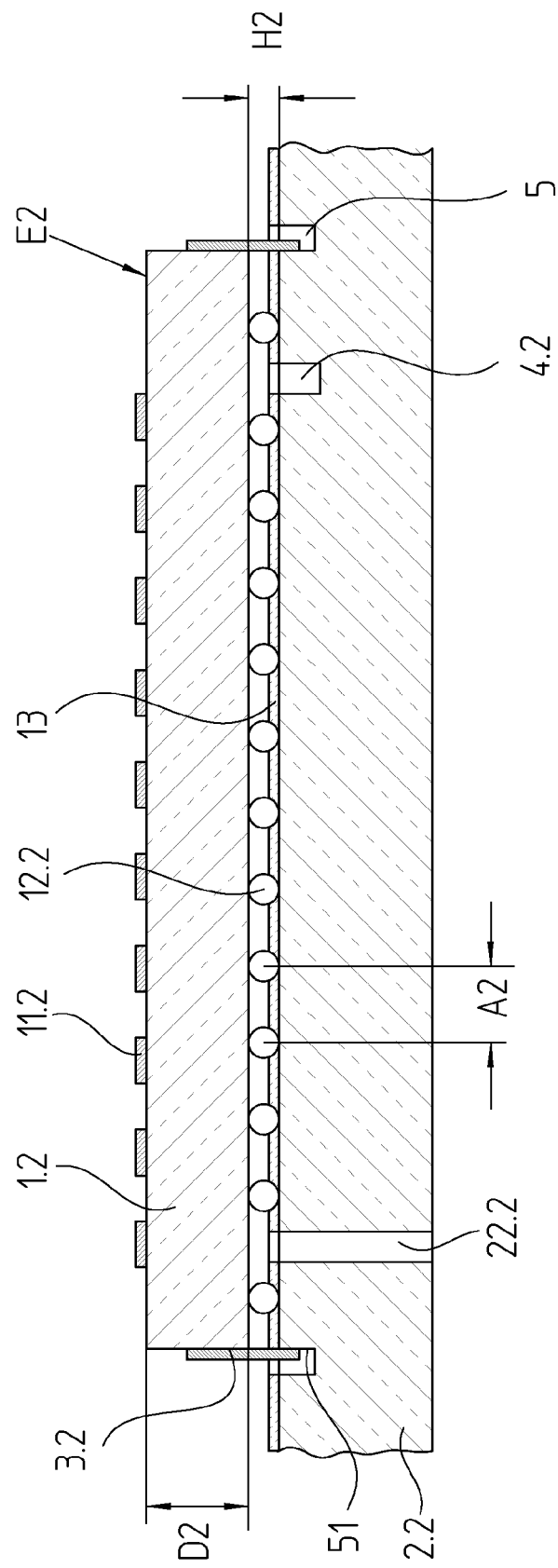
FIG. 4 is a cross-sectional view of an assembly taken cross section through a substrate with a scale secured to it in a second embodiment of the present invention.
Figure 5:
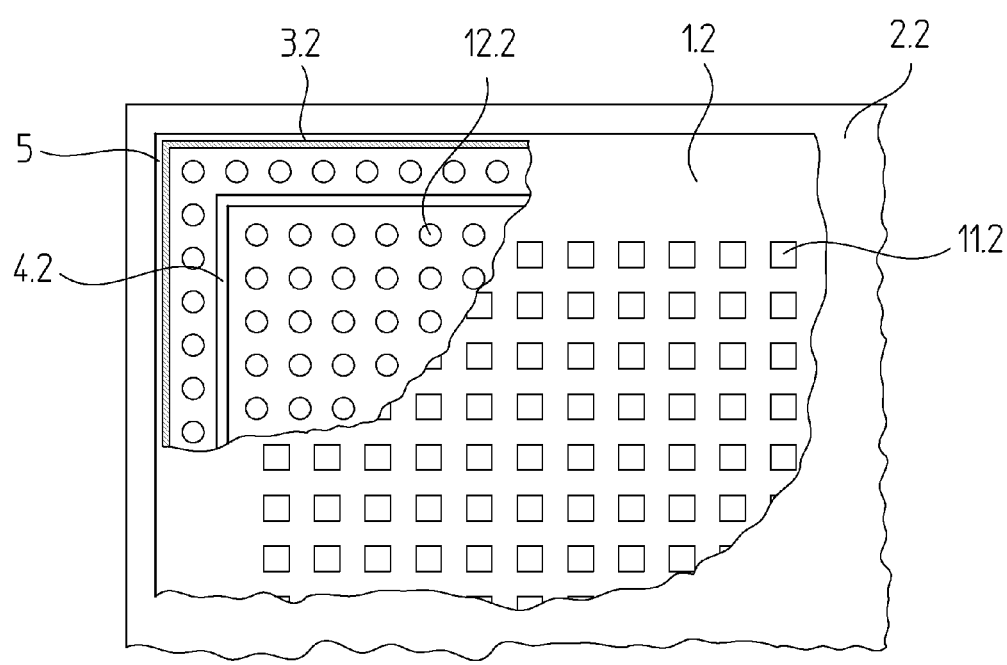
FIG. 5 is a plan view of the assembly of FIG. 4.

It is advantageous to use balls 12.2 as supports for the scale 1.2, as is schematically shown in the second exemplary embodiment shown in FIGS. 4 and 5. At least in the completely installed state of the scale 1.2 on the substrate 2.2, the balls 12.2 are immovably held in their position on the substrate 2.2 via holding structure 13. "Immovably" is defined, on the one hand, such that at the position of the balls 12.2 relative to the substrate 2.2 is invariable, and, on the other hand, the balls 12.2 are not rotatable.

In particular, the balls 12.2 have a diameter H2 of between 20 μm and 200 μm, and they advantageously are made of a material which has the same thermal expansion as the scale 1.2. For holding the balls 12.2 on the scale 1.2 or on the substrate 2.2 without drifting, the holding structure 13 is advantageously employed in the form of a layer in which the balls 12.2 are bound locally stably. This layer is for instance photoresist, polymer, or a foil and has a thickness which is a fraction of the diameter H2 of the balls 12.2, typically being from 0.2 to 2 μm.

In FIG. 5, the two-dimensional measuring graduation 11.2 of the scale 1.2 is shown in plan view. For better illustration of the two-dimensionally distributed arrangement of the balls 12.2 between the scale 1.2 and the substrate 2.2, the scale 1.2 has been left out in one part of the view.

To achieve the requisite sealing off of the space between the scale 1.2 and the substrate 2.2, a sealing lip 3.2 in foil form is used in this example. The sealing lip 3.2 is on the one hand secured to the scale 1.2, and on the other, it engages a groove 5 of the substrate 2.2. This sealing lip 3.2 engages the groove 5 of the substrate 2.2 in such a way that the inward-pointing surface of the sealing lip 3.2 presses against an inner boundary face 51 of the groove 5. This boundary face 51 is aligned with the shape of the sealing lip 3.2, and this shape is oriented perpendicular to the measuring graduation plane E2. Inside the sealed-off space, once again there is a suction conduit 4.2, which is dimensioned as in the first exemplary embodiment. Both functionally identical elements and size indications are identified in the drawings of the second exemplary embodiment by the same reference numeral as in the first exemplary embodiment, but with "0.2" appended.

Further embodiment variations of the method and devices in accordance with the present invention of course exist besides the explained examples and embodiments.

We claim:

1. An assembly comprising:
   a substrate;
   a scale held on said substrate, wherein said scale comprises a measuring graduation, and said scale is held on said substrate by pneumatic suction, wherein said scale is braced on said substrate via two-dimensionally distributed, spaced-apart supports, which are disposed facing a measurement area defined by said measuring graduation and wherein adjacent ones of said supports are spaced apart from one another at a mutual period that is less than a thickness of said scale;

wherein said supports have a structure such that a connection by optical contact bonding between said supports and said scale and/or between said supports and said substrate is prevented at least in said measurement area; and wherein a space between said scale and said substrate is sealed off from surroundings by a sealing structure.

2. The assembly as defined by claim 1, wherein surface regions contacting one another between said supports and said scale and/or between said supports and said substrate have such great roughness that said roughness prevents a connection by optical contact bonding between said surface regions.

3. The assembly as defined by claim 1, wherein said supports contact said scale and/or said substrate in point-like form, so that a connection by optical contact bonding is prevented.

4. The assembly as defined by claim 1, wherein said supports are disposed and embodied such that has a they form mutual free spaces with a height of at least 20 μm and a mutual peripheral spacing of at least 20 μm.

5. The assembly as defined by claim 1, wherein said substrate is made of a material that coefficient of thermal expansion that is identical to a coefficient of thermal expansion of a material of said scale.

6. The assembly as defined by claim 5, wherein said coefficient of thermal expansion of said substrate is less than $1.5 \times 10^{-6} K^{-1}$.

7. The assembly as defined by claim 6, wherein said coefficient of thermal expansion of said substrate is less than $0.1 \times 10^{-6} K^{-1}$.

8. The assembly as defined by claim 1, wherein said pneumatic suction is effected via at least one suction conduit, which is disposed outside said measurement area.

9. The assembly as defined by claim 1, wherein protrusions in a two-dimensional grid, which form said supports, are embodied integrally on said scale or said substrate.

10. The assembly as defined by claim 1, wherein said supports are spacer elements which are embodied in a structured intermediate layer.

11. The assembly as defined by claim 1, wherein said supports are balls.

12. The assembly as defined by claim 11, wherein said balls are held immovably in their positions via a holding structure.

13. The assembly as defined by claim 12, wherein said holding structure comprises a layer disposed on the substrate or said scale, in which said balls are embedded, and a thickness of said layer is a fraction of a diameter of said balls.

14. A method for holding a scale on a substrate during the scanning of a measuring graduation of said scale for position measurement, wherein said holding during said position measurement is effected by pneumatic suction of said scale against said substrate, said method comprising:

supporting a scale on a substrate by disposing two-dimensionally distributed supports on said scale or said substrate, wherein said supports are disposed facing a measuring graduation of said scale and said supports have a mutual period that is less than a thickness of said scale;

forming a connection by optical contact bonding between said supports and said scale and/or between said supports and said substrate is prevented at least in a measurement area of said scale;

generating a holding force, via pneumatic suction, that acts in a space between said scale and said substrate; and sealing off said space from surroundings by a sealing structure.

* * * * *

UNITED STATES PATENT AND TRADEMARK OFFICE
CERTIFICATE OF CORRECTION

PATENT NO.         : 8,650,769 B2                                    Page 1 of 1
APPLICATION NO.    : 13/260891
DATED              : February 18, 2014
INVENTOR(S)        : Speckbacher et al.

It is certified that error appears in the above-identified patent and that said Letters Patent is hereby corrected as shown below:

On the Title Page

Item [73], before "Johannes Heidenhain" insert --Dr.--.

Signed and Sealed this
Tenth Day of June, 2014

Michelle K. Lee
*Deputy Director of the United States Patent and Trademark Office*